N. D. CHARD.
FEED SCREW GAGE.
APPLICATION FILED NOV. 13, 1916.

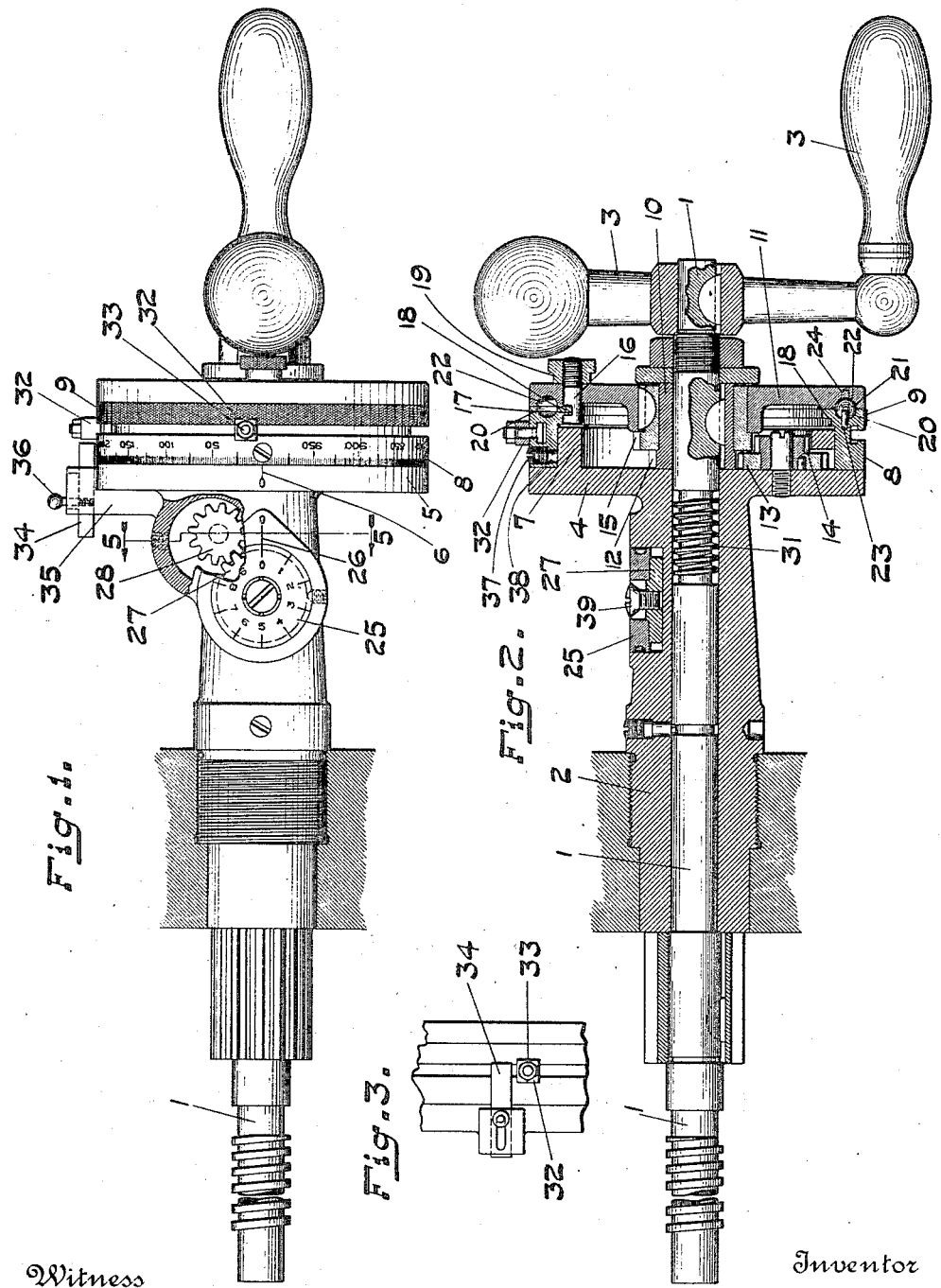

1,235,437.

Patented July 31, 1917.
2 SHEETS—SHEET 2.

Witness
Walter H. Troemel.

Inventor
Nicholas D. Chard
Mumford & Dodiak
Attorneys

UNITED STATES PATENT OFFICE.

NICHOLAS D. CHARD, OF NEWCASTLE, INDIANA.

FEED-SCREW GAGE.

1,235,437. Specification of Letters Patent. Patented July 31, 1917.

Application filed November 13, 1916. Serial No. 131,103.

*To all whom it may concern:*

Be it known that I, NICHOLAS D. CHARD, a citizen of the United States, residing at Newcastle, Henry county, and State of Indiana, have invented and discovered certain new and useful Improvements in Feed-Screw Gages, of which the following is a specification.

My invention relates to feed-screw gages and its object is to provide means whereby a feeding screw may be adjusted rapidly to the desired position to set a cutter or other operating tool to the desired diameter of work to be formed or depth of cut to be effected and to enable such operation to be carried out without calculation upon the part of the operator and by means of a gaging mechanism which renders possible a very fine degree of adjustment of the feed screw. The invention also contemplates means associated with the gage for permitting the feed screw to be operated to withdraw the same from the work without disturbing the previous adjustment of the gage and permitting the feed screw to be turned back to such previously fixed position without resetting the gage. The invention also contemplates the provision of stops to enable the gage to be set in advance of the cutting operation to a number of varying diameters as, for instance, to the shoulders of a stepped shaft, and the feed screw to be adjusted successively to the different diameters by merely turning the screw to the respective stops without re-setting the gage.

The invention is particularly designed for use in connection with lathes, milling machines and planers.

When used in connection with lathes, it may be applied either to the operating screw for the tool-carrying cross slide or to the lead screw or both. When used in connection with the lead screw, the adjustable dogs are the means employed, and some form of automatic trip mechanism of usual construction may be employed in connection therewith. The particular embodiment of the invention illustrated in the accompanying drawings shows the device applied to the screw of the cross slide of a lathe.

With the above objects in view, my invention is embodied in preferable form in the construction, arrangement and combination of parts hereinafter described and illustrated in the accompanying drawings.

Figure 4:
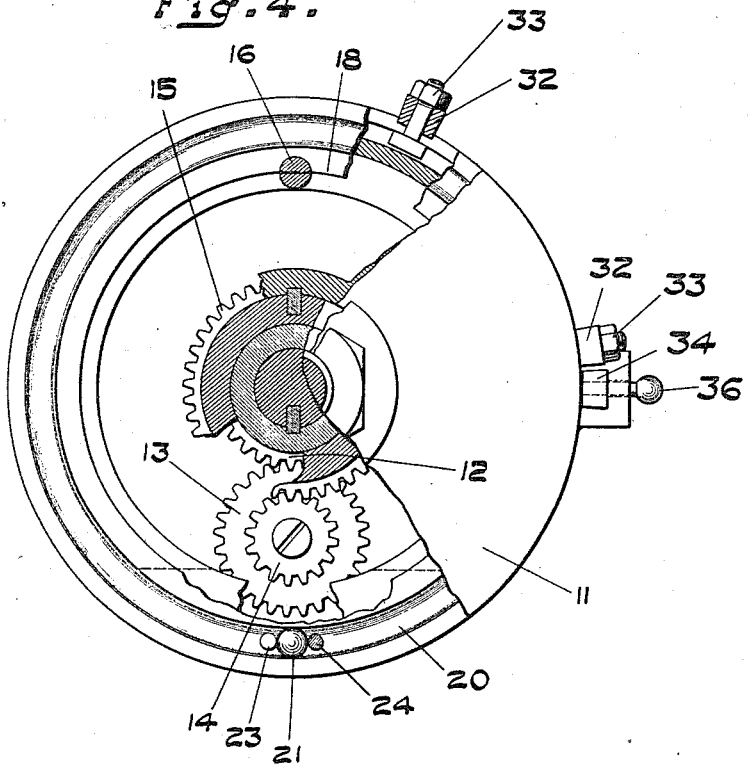
Figure 5:
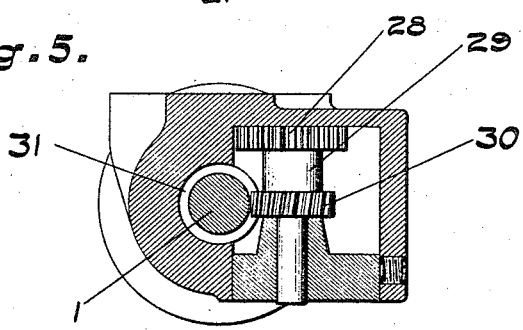

In these drawings, Figure 1 is a top plan view of the gaging mechanism showing the same applied to a cross slide screw; Fig. 2, a vertical central section; Fig. 3, a detail plan of the stop for the gage ring; Fig. 4, a front end view in elevation partly broken away showing the reduction gears and Fig. 5, a section on the line 5—5 of Fig. 1.

Referring to the drawings, 1 indicates the screw to be rotated for the purpose of adjusting a slide or other device carrying a tool or other member to a desired diameter of work to be turned or determining the depth of cut of the cutting tool for any other purpose, the slide or other supporting means and the tool adapted to be carried thereby in any such arrangement not being herein shown.

The screw is journaled in a sleeve 2 fixed on the carriage of the machine and keyed to said screw is a rotatable operating handle 3. Fixed to the sleeve near the outer end thereof is a disk 4 having a peripheral surface 5 which carries a central fixed gage mark 6. A collar 7 projects from the inner face of this disk and on such collar is rotatably mounted a gage ring 8 provided with numbered indications forming a scale which is graduated in thousandths of an inch, such scale being arranged around the periphery of the member 8, in graduations from 0 to 1000. This rotatable ring 8 is provided with a knurled surface 9 whereby it may be readily turned by hand to set any one of the graduations on the scale opposite the mark 6 formed on the periphery of the disk 5.

On a plain surfaced collar 10 of the screw member 1 is mounted loosely and rotatably the hub of a disk 11 adapted to constitute a gage ring-actuating and coupling member between said scale-carrying member and the gear mechanism operated by the rotation of the screw whereby the ring 8 may be turned to an indicating position corresponding to the distance the member controlled by the screw is caused to travel. This coupling disk 11 is normally disconnected from the scale ring and is connected to the screw through a train of reduction gears whereby two and one-half revolutions of the screw will produce one revolution of the ring. Although the particular ratio of the gears herein shown is two and one-half to one, such ratio may be altered if desired and preferably a ratio of five to one is employed. The ratio is such that the true diameter or distance to which the screw controlled member is adjusted is registered by the scale ring.

The compounding or reduction gear mechanism includes a gear wheel 12 fixed on the shaft of the screw 1 and engaging a smaller gear 13 mounted loosely on a stub shaft which carries a small gear 14 adapted to engage the large gear 15 fixed on the hub of the coupling and actuating ring 11.

The coupling disk or ring 11 carries a pin 16 projecting axially through the disk and provided near its inner end with a peripheral flat slot 17 which engages an annular shoulder 18 formed on the gage scale ring 8 and this pin is adapted to be clamped against the edge of said shoulder to lock the members 8 and 11 together or to be loosened from such engagement to permit said parts to rotate separately. The locking engagement of the pin with the flange is effected by means of a clamping nut 19 engaging threads on the outer end of the pin.

The ring 8 is provided on its outer face with a groove 20 in which is mounted to roll freely a ball 21, this ball being also adapted to fit in a complementary groove 22 formed in the outer coupling ring 11. Axial pins 23 and 24 spaced apart axially project from the members 8 and 11 respectively and are located inside the grooves and adapted to alternately contact with said ball, so as to carry the same around until the ball strikes the opposing pin whereupon said two members will be moved together. This arrangement permits a limited movement of the two members a distance equal to two revolutions of one of the parts relative to the other. These pins serve as stop members to enable the two rings to be moved in proper relation and to enable the coupling ring to be reset against the gage ring after the screw controlled member has been fixed in position and after any separate movement of the coupling ring, such as in retracting the screw, without changing the diameter.

To assist in rapidly gaging the diameter or depth of cut, a gross or large graduation finder is provided in connection with the indicating scale on the member 8 and this device is mounted in the sleeve of the screw and consists of a rotating scale-carrying disk 25 provided with inch graduations which are adapted to register with a mark 26 on the sleeve. This graduated dial is detachably mounted on a gear 27 adapted to mesh with a gear 28 carried by a sleeve 29 on which is fixed a worm 30 adapted to mesh with a worm screw 31 carried by the shaft on the main feed screw 1 whereby as the feed screw is turned a certain number of revolutions, the graduated scale disk will be turned correspondingly to indicate in inches the extent to which the screw controlled member has been moved forward. This gross graduation scale merely serves as a convenient means for quickly approximating the diameter to be cut in inches, the exact diameter in thousandths of an inch, however, being obtained by the adjustment to the scale on the ring 8. The dial bears graduations from 0 to 9 and is adapted to be turned one revolution while the screw is making ten revolutions.

The scale ring 8 is provided with a series of T blocks 32 constituting dogs and having tongues fitting in a T-slot in said ring and adapted to be adjusted in said slot and fixed opposite any one or more graduations by means of set screws 33. These dogs are adapted to be engaged by a sliding stop 34 carried on a slotted bracket 35 rising from the sleeve of the feed screw and which stop is adapted to be slid in and out of the line of the scale ring dogs by means of a screw pin 36. The object of this latter arrangement is to provide means by which the gage may be set in advance to different diameters, for instance, to the varying sizes of a shouldered or stepped shaft, whereby after one diameter has been cut the screw may be turned successively to the dogs determining the other diameters without re-setting the gage. This is accomplished by fixing separate dogs 32 at the different graduations corresponding to the different diameters. Or in such use of the device the graduations may be dispensed with and the different diameters of the work obtained by calipering and setting the dogs accordingly.

In the gage ring 8 is a screw 37 adapted to bear against a loose pin 38, the inner end of which bears against the surface of the collar 7. This screw and pin serve as detaining means to either lock the gage scale ring in place after the adjustment of the feed screw has been obtained or to act as frictional retarding means for the scale ring to check and retard the rotative movement of the scale ring and control the force of the hand pressure of the operator and thus facilitate the rapidity of the registry of the graduations with the notch 6.

The dial 25 of the large scale finder is made separate from its gear 27, and is clamped thereto by a screw 39. By this arrangement the dial may be loosened to set it at zero after the diameter of the work has been predetermined or at the graduation corresponding to the initial diameter to be cut when such is directly determined.

The operation of the device is as follows:—

As heretofore stated, the invention may be applied not only to lathes, including the several feeding or adjusting screws thereof, but also to other machine tools. Assuming that it is applied to the tool-carrying cross-slide of a lathe and that the tool is to be adjusted to cut threads on a screw, the tool is fixed in the holder and in the event that the lathe is to be set to begin operation originally without any previous adjustment, the tool is set against the work and the rings 8 and 11 relatively rotated until the pins 23 and 24 are carried into contact with the ball 21, thus locating the ring 8 to the circle of movement of the coupling member and screw. The dial 25 and the scale ring 8 are then set at zero. Then the frictionally clamping screw 37 is tightened so as to clamp the ring 8 to its supporting collar. After a cut has been made, it is necessary to retract the tool to take the next cut and this is effected by turning back the screw handle which will rotate the ring 11 back freely, and then when the tool is to be brought up to position again, the ring 11 is turned forward until its pin 24 carries the ball 21 against the pin 23, thus stopping the ring 11 and the tool at the previous adjustment. To obtain a deeper cut of the thread, the handle is turned still further forward to carry the pin of the ring 11 against the ball with sufficient pressure to turn the scale ring to the next graduation desired, the screw 37 and pin 38 serving as a friction drag to retard the movement of the scale ring and thus enable the graduation to be brought accurately opposite the notch. These retracting and adjusting movements are continued until the thread has reached its final depth.

In thus chasing the thread on a screw, the indications on the screw merely register the depth of a cut and indicate only the movement of the tool relative to a fixed point, and do not denote the actual diameter or diameters of the work.

In duplicating diameters for successive pieces of cylindrical work, it is necessary to first obtain the initial diameter, which is preferably done by calipering the work and setting the dial and scale ring independently of the same to the indications of the diameter so determined, or an initial diameter may be obtained by moving the tool against the tail stock spindle or center which are of known diameters and adjusting the dial and scale ring separately from the screw to indicate such diameter.

Then the screw 37 is fixed in position, the pins 23 and 24 having been brought in contact with the ball 21, whereby the relative rotative positions of the rings 8 and 11 are determined. Then the diameter to be cut is determined by turning the screw and through it rotating the gage members until the indications denoting such diameters are brought opposite the fixed notches. The screw is retracted and re-positioned in the same manner as described in connection with the thread chasing operation, the pins 23 and 24 permitting the free backward movement of the ring 11 through two and one half revolutions and serving to stop said ring and the screw at the previously adjusted position when turned forward again.

To adjust the gage to turn another series of pieces of work of a different diameter from the first series, the ring 8 is turned to the new graduation by the screw handle, the screw 37 acting to retard and control the adjustment.

In cutting a piece of work having several different diameters, as a shouldered or stepped shaft, it is advantageous to set the gage member for all the diameters before beginning the cut. In this adjustment, assuming that an initial diameter has been determined, the screw 37 is loosened and the ring 8 clamped to the ring 11 by tightening the nut 19 and then the screw handle turned to rotate the ring 11 which through the clamping pin 18 will rotate the scale ring until the desired graduation is brought opposite the notch 6. Thereupon the slide stop 34 is moved into the line of the dogs 32 and one of such dogs moved against the stop and clamped to the ring 8 thus providing a gage stop for the first diameter. Then the stop 34 is withdrawn, the ring set to the graduation indicating the next diameter, and another dog 32 clamped in place against the stop 34, and so on until all the diameters have been indicated and dogs set therefor. The cut is then made for one diameter and then the stop 34 withdrawn and rings 8 and 11 moved in unison through the clamping means 18 and 19 to carry the first dog past the stop and the next dog into contact therewith.

If that part of the invention for gaging in advance several different diameters of the same piece of work be used alone, it is possible to dispense with the graduations on the scale ring and obtain the various diameters by calipering and then set the dogs against the stops to the various diameters thus obtained.

In all the adjustments of the screw and gage, when the screw handle is turned, the reduction gears 12, 13, 14 and 15 will be rotated so as to turn the rings 8 and 11 in an exact ratio to the distance the tool is caused to traverse by the screw, thus registering the true depth of cut in chasing threads on a screw or the true diameter in turning work or the true longitudinal distance which the member controlled by the screw is caused to travel.

It will be seen that in chasing threads in which there must be continual successive advances and retractions of the tool to effect cuts of different depth and to withdraw the tool clear of the thread in making such cuts, the free contact pins 23 and 24 and ball 21 are employed for relatively locating the rings 8 and 11, and effecting the movement of the former by the latter, in conjunction with the clamping and retarding set screw 37.

In turning successively different diameters, the connection between the gage ring on one hand and coupling member and screw on the other, is obtained by the nut 19 and pin 18, and the position establishing function is effected by the dogs 32 and stop 34, the screw 37 being left loose.

It is, however, possible to use the pins 23 and 24 and ball 21, instead of the clamping nut 19, in conjunction with the dogs and stop, for adjusting to different diameters, but such method is not as desirable.

In all uses of the device herein shown it will be seen that there are provided in conjunction with the screw, a gaging member and gear mechanism and connecting means between the screw and gaging member, adapted to move the two in unison in such proportion that the true longitudinal movement of the member fed by the screw will be automatically reproduced in the relative rotary movement of the gaging member and screw and means for determining the position to which the gaging member may be turned to measure the extent of adjustment of the screw, such position-determining means consisting either of the graduation and notch and set screw, or the dogs and stop.

In respect to the feature of the free contact gage-locating and retraction-permitting means consisting of the ball 21 and pins 23 and 24, in combination with the clamping member 37, however, it is clear that such combination may be used to advantage on a feed screw provided with the ordinary scale and in which the reduction gear mechanism for registering the true traverse of the screw controlled member is not used.

The reduction gears whereby the gage ring is turned a less number of revolutions than the screw permits the circumference of the ring to contain the complete graduations corresponding to the thousandths of an inch and registering the true distance traversed by the tool carrying member. Such reduction gears thus render it unnecessary to provide a very large ring such as would be impracticable in use but which would have to be supplied for the purpose of carrying all the necessary graduations if the ring merely turned one revolution while the screw was making one revolution, or else necessitate the use of merely the old form of graduated ring indicating merely the number of turns of the screw in connection with the use of which calculations must always be made by the operator to determine the depth of the cut. The reduction gears, therefore, enable the device to be successively set to a number of cuts or diameters without losing the first adjustment which is very desirable, and which it is not possible to obtain with the ordinary graduated ring carried by the screw since in the latter at any complete revolution of the ring the previously obtained adjustment is lost.

The releasable gripping connection between the gage ring and the relatively fixed part on which it is mounted, consisting of the frictional clamping screw 37 is an extremely important element of my invention since it enables the screw to be moved to a new adjustment from the initial adjustment merely by turning the handle of the screw, the said frictional gripping means detaining the parts with sufficient force to enable the operator to retain effective control over the handle. This element may be used to advantage in connection with the balls and stop pin whether or not a reduction gearing is employed.

Having thus described my invention, what I claim is:

1. In combination with a feeding screw for machine tools, a handle for rotating said screw, a gaging mechanism having operative connection with the screw and operable by the rotation of the latter through the handle following the initial setting of the gaging mechanism, to effect new adjustments of the latter for cuts of varying depths, said gaging mechanism including means to register the true longitudinal distance traversed by the screw controlled member.

2. In combination with a feeding screw, a gaging mechanism including a scale and having means operable to be set to positions indicating the true positions of the screw controlled member relative to a fixed point and proportional gear mechanism between the screw and gaging mechanism operable by the rotation of the feeding screw to effect the movement of said controlled member to an extent measured by the adjustment of the gaging member, and a handle connected to the screw.

3. In combination with a feeding screw for machine tools, a gaging mechanism having a rotatable member carrying graduations indicating the distance traversed by the member operated by the screw, and reduction gear mechanism between the screw and graduated member a less number of revolutions than the screw and operable to move the gaging mechanism in such a ratio to the screw movement as to register on the gaging mechanism the said distance traversed.

4. In combination with a feeding screw, a gaging mechanism operable to be set to a predetermined diameter and bearing means to denote the true diameter of the work and reduction gear mechanism between the screw and said gaging mechanism for moving the latter by the screw a less number of revolutions than the screw and at a ratio proportioned to indicate the new diameter to which the screw may be adjusted.

5. In combination with a tool feeding screw, a gaging member graduated to indicate the true distance traversed by the screw controlled member, means for moving said member independently of the screw, a coupling member, reduction gears connecting the screw and said coupling member and proportioned to turn the latter a less number of revolutions than the screw and to produce the proper ratio of movement between said screw and coupling member to register the said true distance of traverse produced by the screw, and means for causing said coupling member and gaging member to move in unison.

6. In combination with a tool feeding screw, a rotatable gage member concentric with the screw and carrying a scale and reduction gear mechanism between said screw and said member for rotating the latter a less number of times than the screw upon the revolution of the latter.

7. In combination with a tool feeding screw, a rotatably adjustable member concentric with the screw and provided with a scale, a second rotatable member also concentric with the feed screw and adapted to move the first member and a reduction gear mechanism between the screw and said second member.

8. In combination with a feeding screw, a gaging member for registering the longitudinal traverse of the member controlled by the screw, means of releasable engagement between the gaging member and a relatively fixed part adapted to hold said parts at an adjusted position but permitting the release of the gaging member under pressure, and means between the said member and the screw to limit the movement of the screw relative to said gage member and permit the latter to turn under pressure applied from the screw, said means being operable to permit the retraction of the screw independently of the gage member.

9. In combination with a feeding screw, a rotatable graduated gaging member, means of releasable engagement between said member and a relatively fixed part carrying a registration mark, whereby the ring may be held in position with a desired graduation opposite said mark but may be advanced to new adjustments by pressure thereon sufficient to release said engagement, contact means operatively intermediate the said screw and said gaging member to effect the checking of the screw movement and to permit the advancement of the gaging member under pressure in the further turning of the screw, and means to permit the retraction of the screw independently of the gaging member.

10. In combination with a feeding screw, a rotatable graduating gaging member, means for frictionally gripping said gaging member to a relatively fixed part, and means for permitting the retraction of the screw independently of the gaging member when the screw is turned in one direction and for stopping the rotative movement of the screw relative to the gaging member when the screw is turned in the other direction.

11. In combination with a feeding screw, a rotatable graduated gaging member, means for frictionally gripping said gaging member to a relatively fixed part to hold the member set at a desired registering point, and to exert a frictional resistance to the member as it is moved under pressure, free contact stop means operatively intermediate the screw and gaging member for relatively locating them in rotative movement and effecting the movement of said member by said screw and permitting the retraction of the screw independently of the gaging member.

12. In combination with a feeding screw, a rotatable graduated gaging member, a connection between the screw and said gaging member, for turning the latter by the screw frictionally gripping detaining means releasable under pressure for said gaging member, and means for permitting the retraction of the screw independently of the gaging member and for stopping the screw at the previously adjusted position when turned forward again.

13. In combination with a feeding screw, a rotatable gage member having graduations indicating length of traverse of the screw controlled member, reduction gears connecting the screw and gage member operable to impart to the latter a movement proportional to the movement of the screw and frictional means to detain the gage member and to retard the free adjusting movement of the same.

14. In combination with a feeding screw, a gage ring surrounding the screw and rotatable independently thereof and bearing distance graduations, a frictional retarding and locking member, a rotatable coupling ring, means for locating one ring relatively to the other rotatively, and gear mechanism connecting said screw and coupling ring to produce a movement thereof proportioned to the longitudinal traverse induced by the screw.

15. In combination with a feeding screw, a rotatable gaging member bearing graduations, means for fixing said member at an adjusted graduation, a coupling member intermediate the screw and gage member and stop means intermediate the coupling member and gage operable to limit the rotative movement of the coupling member relative to the gage member.

16. In combination with a feeding screw, a rotatable gaging scale ring, a rotatable coupling and gage ring actuating member operatively intermediate the screw and gaging ring, means to detain the gaging ring in adjusted position, stop pins projecting oppositely from said gaging ring and coupling member spaced apart axially and a movable stop member bridging the space between said pins and operable to establish a loose abutting engagement between said ring and coupling member.

17. In combination with a feeding screw, a rotatable gage scale ring, a rotatable coupling and actuating ring therefor geared to the screw, said gage scale ring having an annular shoulder, a pin projecting through said coupling ring and having a slot engaging said shoulder, and a locking member engaging said pin exteriorly of the coupling ring and adapted to clamp said pin against said shoulder to lock the two rings together.

18. In combination with a feeding screw, a gaging scale member proportionally geared to said screw for indicating in inches longitudinal traverse of the screw controlled member, a gaging scale member for indicating in thousandths of an inch the true longitudinal traverse of the screw controlled member and reduction gearing between said screw and said latter gaging member proportional to the movement of the screw to cause the thousandths scale member to register the longitudinal movement.

19. In combination with a feeding screw, a rotatable gaging ring concentric of the axis of said screw for registering the distance traversed by the screw controlled member, reduction gearing between the screw and ring, an adjustable dog circumferentially slidable on said ring, a stop member mounted on a relatively fixed part and adjustable axially into the path of said dog, and means to lock the screw and ring together.

20. In combination with a feeding screw, a rotatable gaging ring, means for adjusting said gaging ring to a plurality of positions in advance of operation comprising a series of adjustable dogs circumferentially slidable on said ring and a stop member mounted on a relatively fixed part and projectable into and out of the line of movement of said dogs and means to lock said screw and ring together.

21. In combination with a feeding screw mechanism, means for adjusting said gaging mechanism to a plurality of positions in advance of operation and means for stopping said gaging mechanism by said respective adjustments, and a reduction gear mechanism connecting said screw and said gaging mechanism.

22. In combination with a feeding screw, a rotatable feed gage member having means for predetermining a plurality of gaging positions, a rotatable coupling member geared to the screw and means for determining the relative rotative positions of the gage member and coupling member.

23. In combination with a feeding screw, a rotatable feed gage member having feed distance graduations, a series of stop members carried by said gage member and adjustable to different graduations, a fixed stop, a rotatable coupling and actuating member geared to the screw, and free contact engaging means adapted to operatively connect the coupling member and permitting the retraction of said coupling member without moving the gage member.

24. In combination with a feeding screw, a rotatable gaging member, a rotatable coupling member between the screw and gaging member, a dog carried by said gaging member and circumferentially adjustable relative to said gaging member, a stop for said dog, and means to clamp said gaging member and coupling member together.

25. In combination with a feeding screw, a gaging member rotatable independently of the screw, a rotatable coupling member between the screw and gaging member, reduction gears connecting said screw and coupling member, a dog carried by said gaging member and adjustable to graduations thereon, a stop for said dog and means to clamp said coupling member and gaging member together.

26. In combination with a feeding screw, a gaging member rotatable independently of the screw, a series of dogs carried by said gaging member and adjustable circumferentially relatively to the gaging member to different graduations thereon, a stop for said dogs, a rotatable coupling member between said screw and said gaging member, and means for clamping the coupling member and gaging member together.

27. In combination with a feeding screw, a gaging member rotatable independently of the screw and having graduations indicating the length of traverse of the member controlled by the screw, means for adjusting said gaging member to a plurality of positions determining lengths of traverse, proportional reduction gears operatively intermediate the screw and gaging member and means for locking the gaging member in position to be turned by the screw connected gearing.

In witness whereof, I have hereunto set my hand and seal at Indianapolis, Marion county, Indiana, this 8th day of November, A. D. nineteen hundred and sixteen.

NICHOLAS D. CHARD. [L. S.]

Witnesses:
C. NICOLAY,
LODGE CHARD.